United States Patent [19]

Kasanami et al.

[11] Patent Number: 5,199,791
[45] Date of Patent: Apr. 6, 1993

[54] TEMPERATURE SENSOR

[75] Inventors: Tohru Kasanami; Hiroji Tani; Shigeki Fujiwara, all of Kyoto, Japan

[73] Assignee: Murata Manufacturing Co., Ltd., Japan

[21] Appl. No.: 713,163

[22] Filed: Jun. 11, 1991

[30] Foreign Application Priority Data

Jun. 11, 1990 [JP] Japan ................................ 2-153620

[51] Int. Cl.$^5$ .......................... G01K 7/18; H01C 3/04
[52] U.S. Cl. ..................................... 374/185; 338/25; 338/314; 338/319; 338/320
[58] Field of Search .................. 374/185; 338/25, 314, 338/319, 320

[56] References Cited

U.S. PATENT DOCUMENTS

| | | | |
|---|---|---|---|
| 3,575,053 | 4/1971 | Telinde | 338/25 |
| 3,781,749 | 12/1973 | Iles et al. | 338/25 |
| 4,050,052 | 9/1977 | Reichelt et al. | 338/308 |
| 4,115,493 | 9/1978 | Sakabe et al. | 264/61 |
| 4,568,908 | 2/1986 | Laskaris et al. | 338/320 |
| 4,658,632 | 4/1987 | Sasaki | 374/163 |
| 4,766,409 | 8/1988 | Mandai | 338/25 |
| 4,901,051 | 2/1990 | Murata et al. | 338/25 |
| 5,041,809 | 8/1991 | Payne et al. | 338/25 |

FOREIGN PATENT DOCUMENTS

| | | | |
|---|---|---|---|
| 57-37081 | 8/1982 | Japan . | |
| 57-42588 | 9/1982 | Japan . | |
| 57-49515 | 10/1982 | Japan . | |
| 1147134 | 7/1986 | Japan | 374/185 |
| 0033903 | 2/1990 | Japan | 338/25 |

Primary Examiner—William A. Cuchlinski, Jr.
Assistant Examiner—Diego F. F. Gutierrez
Attorney, Agent, or Firm—Ostrolenk, Faber, Gerb & Soffen

[57] ABSTRACT

A temperature sensor includes a ceramic layered product having a multilayer structure formed of a plurality of ceramic sheets containing an unreducible ceramic material, a plurality of resistive patterns, containing copper or nickel, formed on major surfaces of the plurality of ceramic sheets respectively, a conductive path passing through the ceramic sheets for series-connecting the plurality of resistive patterns with each other, and respective terminals connected to both ends of the series-connected plurality of resistive patterns.

5 Claims, 5 Drawing Sheets

TEMPERATURE SENSOR

BACKGROUND OF THE INVENTION

1. Field of the Invention

The present invention relates to a temperature sensor, and more particularly, it relates to a temperature sensor which utilizes the temperature coefficient of resistance provided by a resistor.

2. Description of the Background Art

A temperature sensor of background interest to the present invention is formed by a ceramic insulating substrate, which is provided thereon with a resistive pattern. Since the resistive pattern is made of a material which has an appropriate temperature coefficient of resistance, it is possible to sense a temperature change in terms of a change of the resistance value of the resistive pattern.

In general, the material for the resistive pattern of such a temperature sensor is mainly prepared from a noble metal such as platinum. For example, paste containing such a noble metal is used to form a resistive pattern on an insulating substrate by printing, and the resistive pattern is thereafter fired.

However, noble metals such as platinum are disadvantageously high-priced.

To avoid the high cost of noble metals, the inventors have tried to prepare the material for such a resistive pattern from a low-priced base metal.

A typical low-priced base metal, copper, for example, has only a small resistivity value of $\rho = 1.72$ $\mu\Omega$cm at 20° C. although its temperature coefficient of resistance is at a relatively high level of 4330 ppm/°C., and copper requires firing in a controlled atmosphere such as a nitrogen atmosphere, for example, since copper is easily oxidized in the air. Thus, copper has generally been employed only in a coil-type device, in an extremely limited field.

This also applies to nickel.

SUMMARY OF THE INVENTION

Accordingly, an object of the present invention is to enable employment of a base metal such as copper or nickel for a resistive pattern in a temperature sensor which comprises an insulating substrate and a resistive pattern formed thereon.

In order to solve the aforementioned technical problem, the inventive temperature sensor comprises a ceramic layered product having a multilayer structure formed by a plurality of ceramic sheets, a plurality of resistive patterns, containing a base metal, formed on major surfaces of the plurality of ceramic sheets respectively, a conductive path series-connecting the plurality of resistive patterns with each other, and terminals connected to both ends of the series-connected plurality of resistive patterns respectively.

The aforementioned base metal is prepared from copper or nickel, for example.

Preferably, the conductive path for series-connecting the plurality of resistive patterns is at least partially defined by conductive paths such as via holes or through holes passing through the ceramic sheets.

According to the present invention, a plurality of resistive patterns are formed in a stacked structure, with the resistive patterns series-connected with each other, in order to compensate for the disadvantageously small resistivity value of the base metal.

Thus, according to the present invention, the material for the resistive patterns is prepared from a base metal such as copper or nickel, whereby it is possible to provide a temperature sensor at a low cost.

Further, the plurality of resistive patterns, which are series-connected with each other in order to increase the resistance value provided by such a base metal, are arranged in a stacked structure, whereby the element size is not increased. In contrast, if a resistor circuit is simply lengthened in order to increase its resistance value, for example, the size of the element is inherently increased.

When the plurality of resistive patterns are connected with each other by conductive paths such as via holes or through holes passing through the ceramic sheets, it is possible to provide the electrical connections of the plurality of resistive patterns entirely in the interior of the ceramic layered product. Thus, it is possible to compactly form the temperature sensor containing such a ceramic layered product.

The inventive temperature sensor is preferably manufactured by forming resistive patterns containing a base metal such as copper or nickel on ceramic green sheets by thick film printing, stacking such a plurality of ceramic green sheets, bringing the ceramic green sheets into pressure contact with each other, and firing the same. Since the base metal such as copper or nickel is easily oxidized in the air, the ceramic green sheets are fired in a reducing or neutral atmosphere such as a nitrogen atmosphere. The ceramic green sheets are preferably prepared from an unreducible ceramic material so that the ceramic material forming the ceramic sheets is not reduced by such controlled atmosphere firing.

The foregoing and other objects, features, aspects and advantages of the present invention will become more apparent from the following detailed description of embodiments of the present invention when taken in conjunction with the accompanying drawings.

DESCRIPTION OF THE PREFERRED EMBODIMENTS

Figure 1:
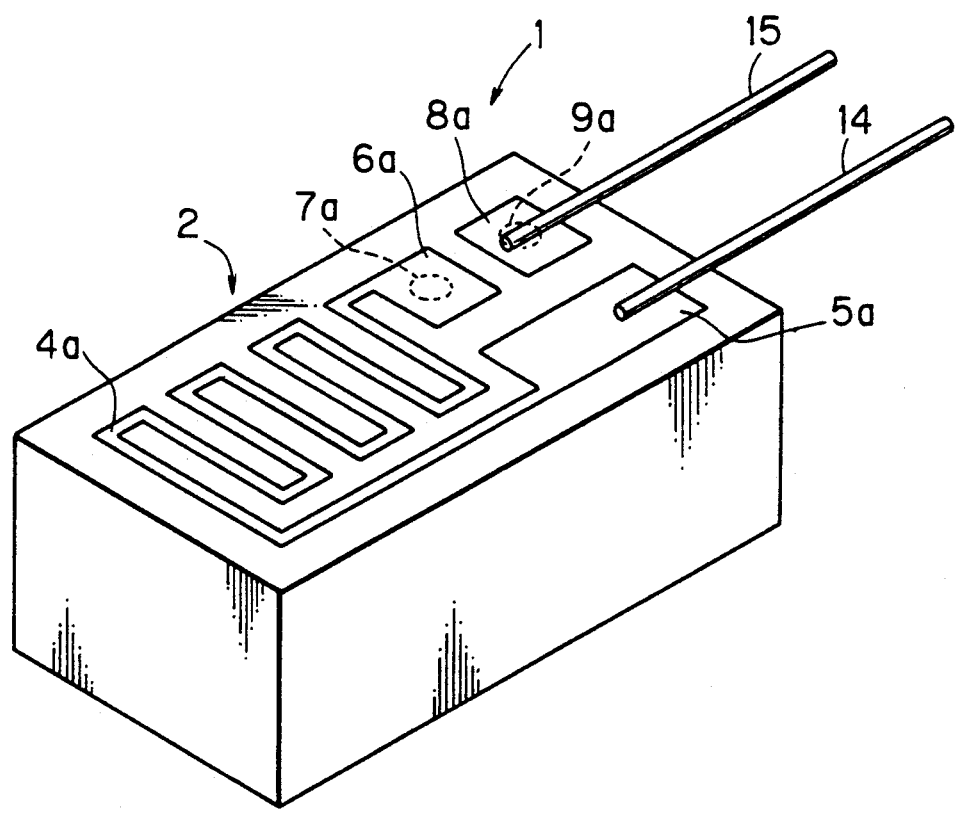
FIG. 1 is a perspective view showing the appearance of a temperature sensor 1 according to an embodiment of the present invention.
Figure 2:
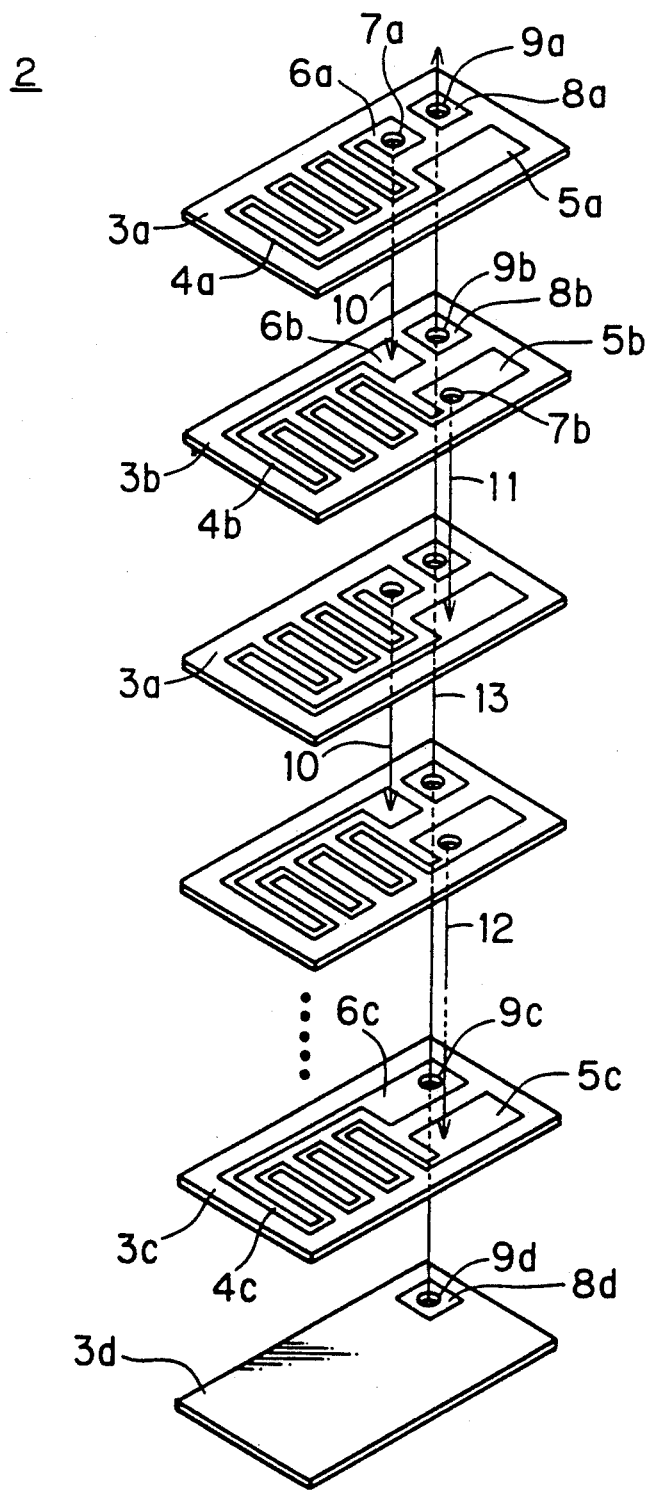
FIG. 2 is an exploded perspective view individually showing ceramic sheets forming a ceramic layered product 2 which is included in the temperature sensor 1 shown in FIG. 1.

FIG. 1 is a perspective view showing the appearance of a temperature sensor 1 according to an embodiment of the present invention. FIG. 2 is an exploded perspective view individually showing ceramic sheets 3 forming a ceramic layered product 2 which is included in the temperature sensor 1 shown in FIG. 1.

Referring to FIG. 2, the ceramic layered product 2 has a multilayer structure which is formed by a plurality of ceramic sheets 3.

The ceramic sheets 3 are classified into four types in accordance with patterns formed on major surfaces thereof. Referring to FIG. 2, the four types of ceramic sheets 3 are indicated by reference numerals 3a, 3b, 3c and 3d respectively.

A meandering resistive pattern 4a is formed on a major surface of each ceramic sheet 3a. A land 5a is formed to be connected with one end of the resistive pattern 4a, while another land 6a is formed to be connected with the other end. A via hole 7a is formed in this land 6a. Still another land 8a is formed independently of the resistive pattern 4a and the lands 5a and 6a. A through hole 9a is formed in this land 8a.

A meandering resistive pattern 4b is formed on a major surface of each ceramic sheet 3b. A land 5b is formed to be connected with one end of the resistive pattern 4b, while another land 6b is formed to be connected with the other end. A via hole 7b is formed in the land 5b. Still another land 8b is formed independently of the resistive pattern 4b and the lands 5b and 6b. A through hole 9b is formed in this land 8b.

A meandering resistive pattern 4c is formed on a major surface of the ceramic sheet 3c. A land 5c is formed to be connected with one end of the resistive pattern 4c, while another land 6c is formed to be connected with the other end. A through hole 9c is formed in this land 6c.

A land 8d is formed in the ceramic sheet 3d. A through hole 9d is formed in this land 8d.

Referring to FIG. 2, the via holes 7a are located in correspondence to the lands 6b as shown by arrows 10, and the via holes 7b are located in correspondence to the lands 5a as well as the land 5c, as shown by arrows 11 and 12 respectively. The through holes 9a, 9b, 9c and 9d are located in correspondence to each other, as shown by an arrow 13.

The resistive patterns 4a, 4b and 4c are formed by thick-film printing of paste which contains a base metal such as copper or nickel. The lands 5a to 5c, 6a to 6c, 8a and 8b are simultaneously formed in such a printing step. The land 8d is also formed by thick-film printing of paste which contains a base metal.

In the printing step using the aforementioned base metal, the base metal paste also fills up the via holes 7a and 7b and the through holes 9a to 9d, to reach both opposite major surfaces of the ceramic sheets 3a to 3d. When the ceramic sheets 3a to 3d are stacked in order of 3a, 3b, 3a, 3b, . . . , 3c and 3d as shown in FIG. 2, therefore, the lands 6a are connected with the lands 6b through the via holes 7a and the lands 5b are connected with the lands 5a or the land 5c through the via holes 7b, while the through holes 9a to 9d define a series of conductive paths.

In place of or in addition to the aforementioned printing of the base metal paste, the base metal paste may be applied into the through holes 9a to 9d by vacuum suction or with a tool such as a needle after the ceramic sheets 3a to 3d are stacked with each other in a desired manner, in order to define the series of conductive paths provided by the through holes 9a to 9d.

In practice, the aforementioned step is carried out with the ceramic sheets 3a to 3d in their green state. Then, the ceramic sheets 3a to 3d are brought into pressure contact with each other after they are stacked, and then they are fired. The base metal paste forming the resistive patterns 4a to 4c etc. is also fired at the same time.

In order to enable such simultaneous firing of the ceramic material contained in the ceramic sheets 3a to 3d and the base metal contained in the resistive patterns 4a to 4c etc., the ceramic material contained in the ceramic sheets 3a to 3d is prepared from unreducible ceramic, and the ceramic sheets 3a to 3d are fired in a controlled atmosphere such as a nitrogen atmosphere.

Thus, the ceramic layered product 2 shown in FIG. 1 is obtained. Lead wires 14 and 15 for serving as terminals are connected to the lands 5a and 8a which are formed on the upper surface of the ceramic layered product 2, thereby completing the temperature sensor 1.

A protective coat (not shown) of resin or glass may be formed in order to protect the resistive pattern 4a, which appears on the surface of the ceramic layered product 2, against moisture, dust and the like.

In the aforementioned temperature sensor 1, the plurality of resistive patterns 4a, 4b and 4c are connected in series with each other. In view of the connection path the resistive patterns provide from the lead wire 14 to the lead wire 15, the land 5a which is connected with the lead wire 14 is connected with the land 5a of the next ceramic sheet 3a through the resistive pattern 4a, the land 6a, the via hole 7a, the land 6b, the resistive pattern 4b, the land 5b and the via hole 7b, and such connection is repeated a prescribed number of times so that the last via hole 7b is connected with the land 5c. This land 5c is connected through the resistive pattern 4c and the series of through holes 9a to 9d with the land 8a, which is connected with the other lead wire 15.

While the via holes 7a and 7b are employed for series-connecting the plurality of resistive patterns 4a to 4c with each other and the through holes 9a to 9d are employed to allow the lead wires 14 and 15 to be mounted on the same surface of the ceramic layered product 2 in the aforementioned embodiment, such conductive paths may alternatively be formed on the outer surface of the ceramic layered product 2. Further, although the conductive paths are made of the same base metal paste as that forming the resistive patterns 4a to 4d in the aforementioned embodiment, the conductive paths may alternatively be made of a resistive or conductive material having a different composition.

The lead wires 14 and 15 may alternatively be mounted on different surfaces of the ceramic layered product 2 respectively. For example, the lead wire 15 may be mounted on the lower surface of the ceramic layered product 2, instead of the upper surface shown in FIG. 1. In this case, a land for connecting the lead wire 15 may be formed on the lower surface of the ceramic sheet 3d shown in FIG. 2 in a position corresponding to the through hole 9d. In this case, further, it is not necessary to form the through holes 9a and 9b and the lands 8a and 8b related thereto.

In the above description, the ceramic sheets 3a to 3d already having prescribed sizes are stacked with each other as shown in FIG. 2 in order to obtain the ceramic layered product 2 shown in FIG. 1. Alternatively, individual ceramic sheets may be provided with patterns for obtaining a plurality of ceramic layered products respectively, and then the ceramic sheets may be stacked with each other and thereafter cut to obtain a plurality of ceramic layered products.

Samples experimentally prepared for evaluating characteristics of the inventive temperature sensor 1 are now described.

First, a low-temperature-sintering-type unreducible ceramic material prepared from a $BaO.SiO_2.Al_2O_3.CaO.B_2O_3$ compound was employed as a ceramic material for forming ceramic sheets 3a to 3d having resistive patterns etc. formed of copper paste as hereinafter described, while an unreducible type ceramic material prepared from a $TiO_2.BaO.CaO.ZrO_2$ compound described in Japanese Patent Publication No. 56-46641 was employed for forming ceramic sheets 3a to 3d having resistive patterns etc. formed of nickel paste.

Paste containing copper and paste containing nickel were employed as materials for forming the resistive patterns 4a to 4c and the lands 5a to 5c, 6a to 6c, 8a, 8b and 8d as well as materials for filling up the via holes 7a and 7b and the through holes 9a to 9d respectively.

Print patterns for the resistive patterns 4a to 4c formed by printing were 150 μm in line width and 200 μm in gap width.

In each sample, 30 ceramic sheets 3a to 3d were stacked with each other. Specifically, 14 ceramic sheets 3a were alternately stacked with 14 ceramic sheets 3b, and single ceramic sheets 3c and 3d were stacked in this order under such a laminate.

The stacked ceramic sheets 3a to 3d were fired in an atmosphere containing $N_2$ and not more than 13% of $H_2$, at firing temperatures of 990° C. for the sample containing the copper paste and 1330° to 1350° C. for the sample containing the nickel paste.

The lead wires 14 and 15 were prepared from platinum clad wires, and resistance-welded to the lands 5a and 8a respectively.

Figure 3:
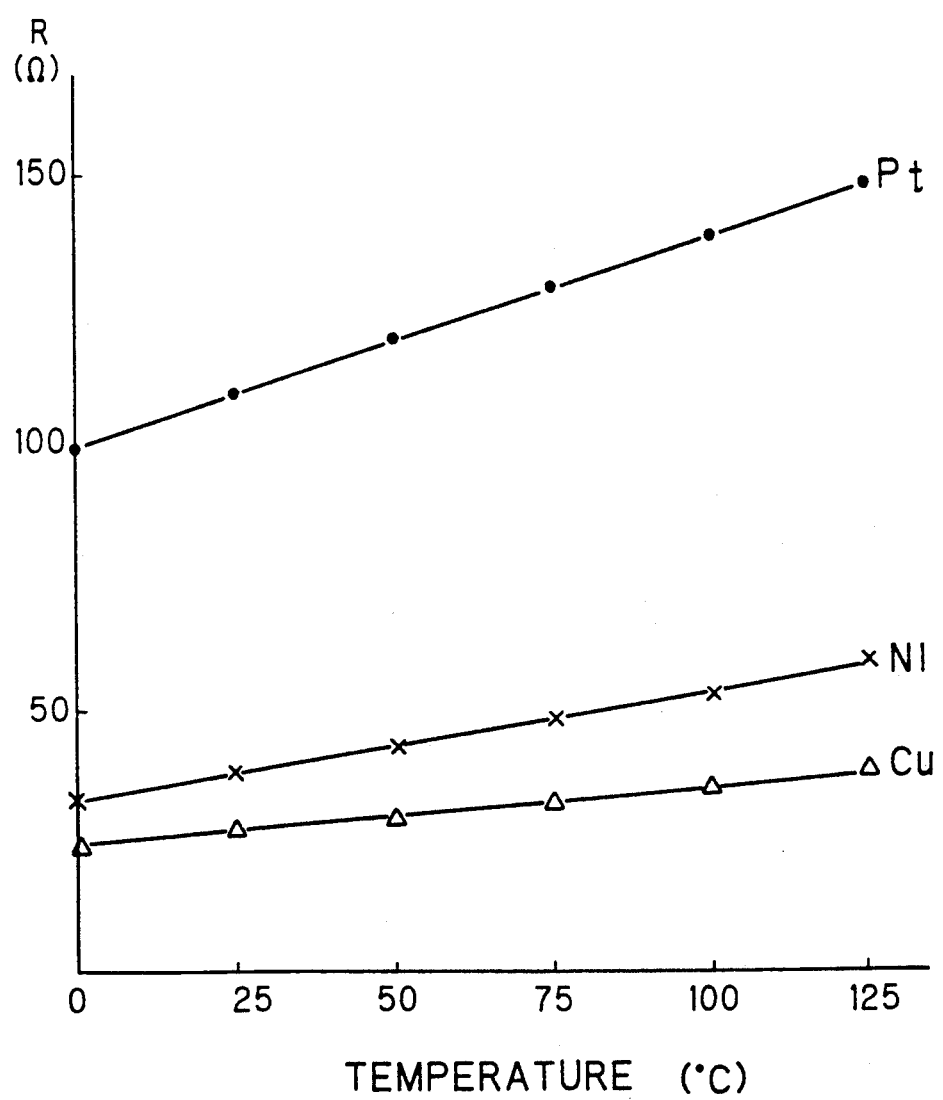
FIG. 3 illustrates changes of resistance values R which are caused by temperature changes in relation to experimentally obtained samples.
Figure 4:
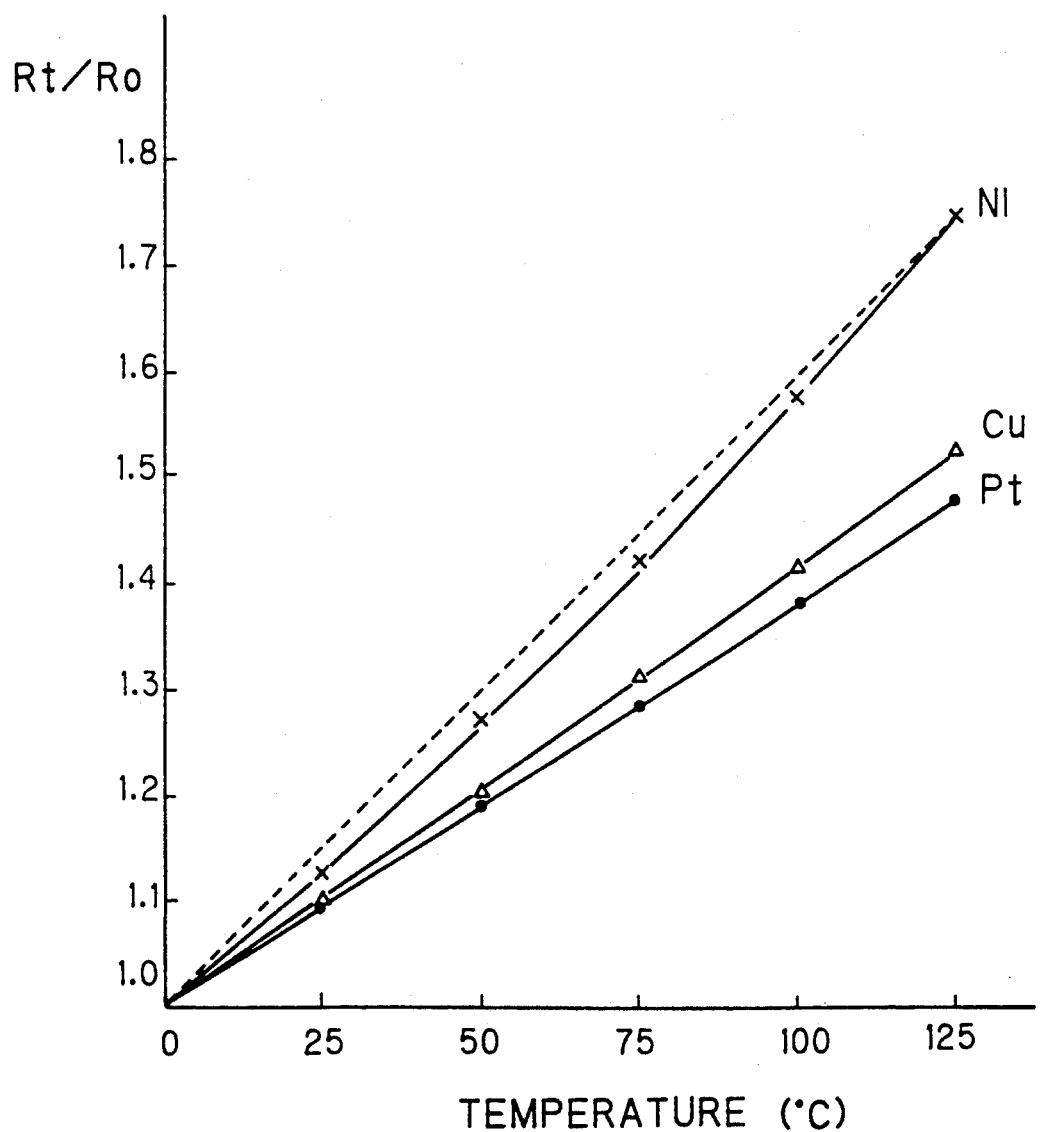
FIG. 4 illustrates ratios ($R_t/R_o$) of resistance values ($R_t$) at certain temperatures to resistance values ($R_o$) at 0° C. in relation to experimentally obtained samples.
Figure 5:
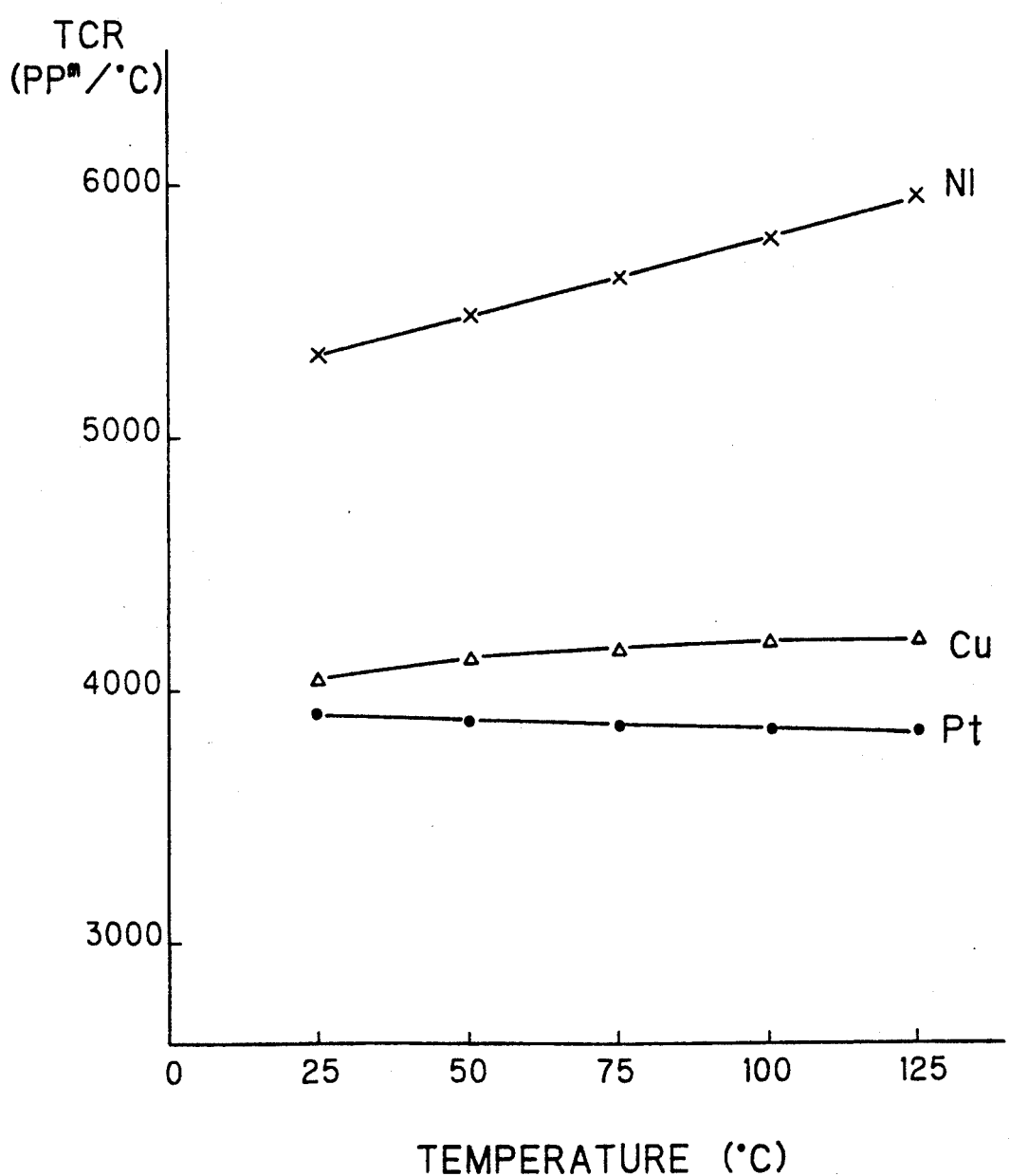
FIG. 5 illustrates temperature coefficients of resistance TCR at respective temperatures in relation to experimentally obtained samples.

FIGS. 3 to 5 show some characteristics of the samples formed in this way.

FIG. 3 illustrates changes of resistance values R caused by temperature changes.

FIG. 4 illustrates ratios ($R_t/R_o$) of resistance values ($R_t$) at certain temperatures to resistance values ($R_o$) at 0° C.

FIG. 5 illustrates temperature coefficients of resistance TCR at respective temperatures. Each temperature coefficient of resistance TCR is expressed as follows:

$$TCR[ppm/°C.] = (R_t - R_o) \times 10^{-6}/(R_o \times t)$$

where $R_t$ represents a resistance value at a certain temperature (t [°C.]), and $R_o$ represents a resistance value at 0° C.

Referring to FIGS. 3 to 5, "Cu" indicates the sample whose resistive patterns were made of the copper paste, and "Ni" indicates the sample whose resistive patterns were made of the nickel paste. A comparative sample was prepared, namely a temperature sensor, whose resistive patterns were made of platinum paste. This comparative sample was a commercially available temperature sensor whose resistance value is 100 Ω at 0° C. In more concrete terms, this temperature sensor has a resistive pattern of platinum paste, which is baked in a natural atmosphere at a temperature of 850° C., on a fired alumina substrate.

As understood from FIGS. 3 to 5, it is practically possible to attain characteristics which are by no means inferior to those of a temperature sensor having a resistive pattern of platinum, even if the resistive patterns are prepared from a base metal such as copper or nickel.

When resistive patterns prepared from copper paste are simultaneously fired with ceramic sheets, the ceramic material for the ceramic sheets may be prepared from another unreducible ceramic material of $Al_2O_3.CaO.SiO_2.MgO.B_2O_3$, cordierite, $ZnO.MgO.Al_2O_3.SiO_2$, $SiO_2.B_2O_3$ glass + $Al_2O_3$, or the like, in place of the aforementioned material of $BaO.SiO_2.Al_2O_3.CaO.B_2O_3$.

When resistive patterns prepared from nickel paste are simultaneously fired with ceramic sheets, on the other hand, the ceramic material for the ceramic sheets may be prepared from an unreducible ceramic material which is disclosed in Japanese Patent Publication No. 57-37081, 57-42588 or 57-49515, in place of the aforementioned material of $TiO_2.BaO.CaO.ZrO_2$.

The three Japanese publications mentioned above respectively disclose the following non-reducing dielectric ceramic compositions:

1. Japanese Patent Publication 57-37081

Non-reducing dielectric ceramic compositions comprising (BaCa) $ZrO_3$ and $MnO_2$ and having the following general formula:

$$(Ba_x Ca_{1-x})_y ZrO_3 + zMnO_2,$$

wherein x and y of $(Ba_x Ca_{1-x})_y ZrO_3$ are in the following ranges and $MnO_2$ takes the following proportion by weight when the weight of $(Ba_x Ca_{1-x})_y ZrO_3$ is taken as 1.00.

$0 < x \leq 0.20$ $0.85 \leq y \leq 1.30$ $0.0005 \leq z \leq 0.08$ (proportion by weight)

2. Japanese Patent Publication 57-42588

Non-reducing dielectric ceramic compositions in barium titanate dielectric ceramic compositions shown by the following composition formula:

$$\{(Ba_{1-x-y}Ca_x Sr_y)O\}_m \cdot TiO_2,$$

wherein m, x and y are in the following ranges, respectively;

$1.005 \leq m \leq 1.03,$ $0.02 \leq x \leq 0.22,$ and $0.05 \leq y \leq 0.35$

3. Japanese Patent Publication 57-49515

Non-reducing dielectric ceramic compositions in barium titanate dielectric ceramic compositions shown by the following composition formula:

$$\{(Ba_{1-x-y}Ca_x Sr_y)O\}_m \cdot (Ti_{1-z}Zr_z)O_2,$$

wherein m, x, y and z are in the following ranges, respectively;

$1.005 \leq m \leq 1.03,$ $0.02 \leq m \leq 0.22,$ $0.05 \leq y \leq 0.35,$ and $0.00 < z \leq 0.20$.

Although embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A temperature sensor comprising:
    a ceramic layered body having a multilayer structure formed of a plurality of ceramic sheets having respective major surfaces;
    a plurality of resistive patterns containing copper formed respectively on first major surfaces of said plurality of ceramic sheets;
    conductive means series-connecting said plurality of resistive patterns with each other;
    a pair of terminals connected respectively to both ends of said series-connected plurality of resistive patterns; and
    said plurality of ceramic sheets containing an unreducible ceramic material selected from the group consisting of $Al_2O_3.CaO.SiO_2.MgO.B_2O_3$, cordierite, $ZnO.MgO.Al_2O_3.SiO_2$, $SiO_2.B_2O_3$ glass+$Al_2O_3$, and $BaO.SiO_2.Al_2O_3.CaO.B_2O_3$.

2. A temperature sensor in accordance with claim 1, wherein said conductive means forms a conductive path passing through said ceramic sheets between respective pairs of resistive patterns.

3. A temperature sensor in accordance with claim 2, wherein each of said ceramic sheets has at least one means for providing a conductive through-hole conductively connected to the corresponding resistive pattern of that ceramic sheet, for connecting that resistive pattern to a resistive pattern on an adjacent ceramic sheet in said ceramic layered body.

4. A temperature sensor in accordance with claim 1, wherein said ceramic material is sinterable at low temperature.

5. A temperature sensor in accordance with claim 4, wherein said ceramic material is sinterable at approximately 990° C.

* * * * *